W. C. STEVENS.
TIRE OPENING MACHINE.
APPLICATION FILED MAY 7, 1918.

1,288,733.

Patented Dec. 24, 1918.
3 SHEETS—SHEET 1.

WITNESS

INVENTOR.
William C. Stevens.
BY G. R. Ely
ATTORNEY

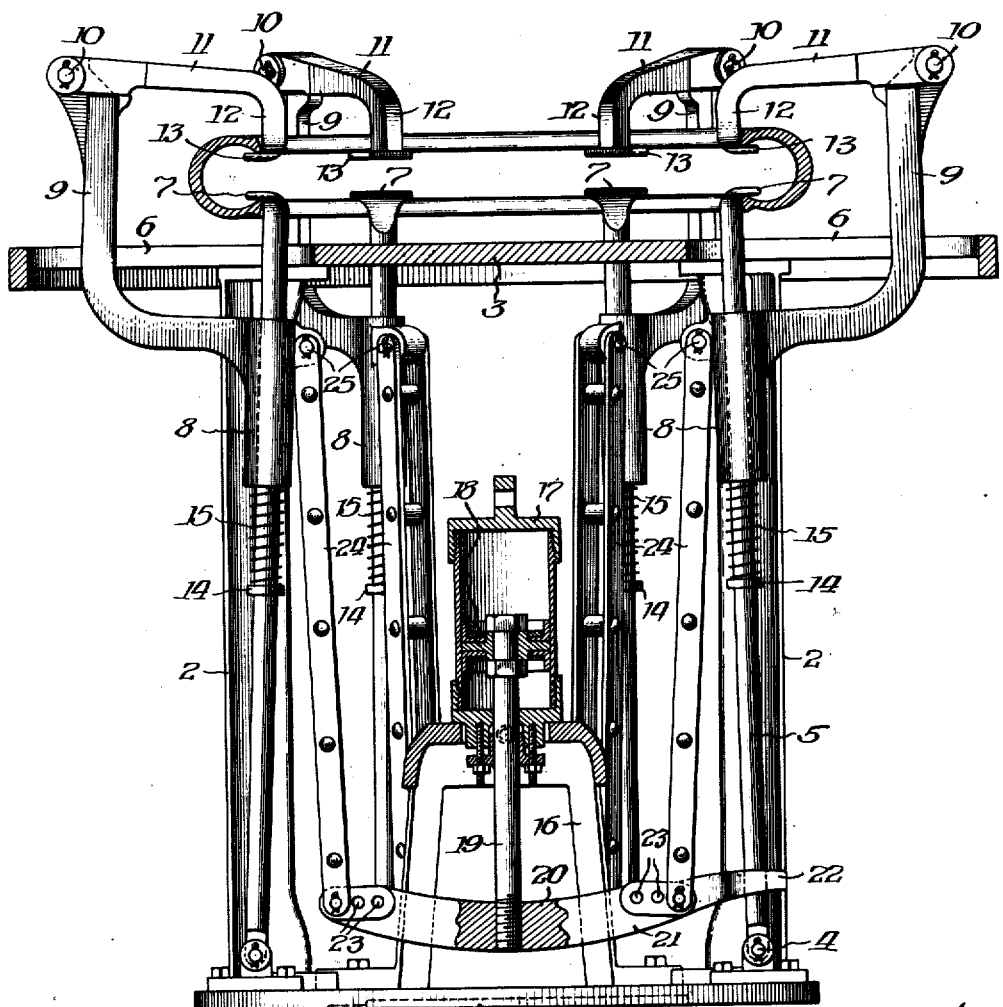

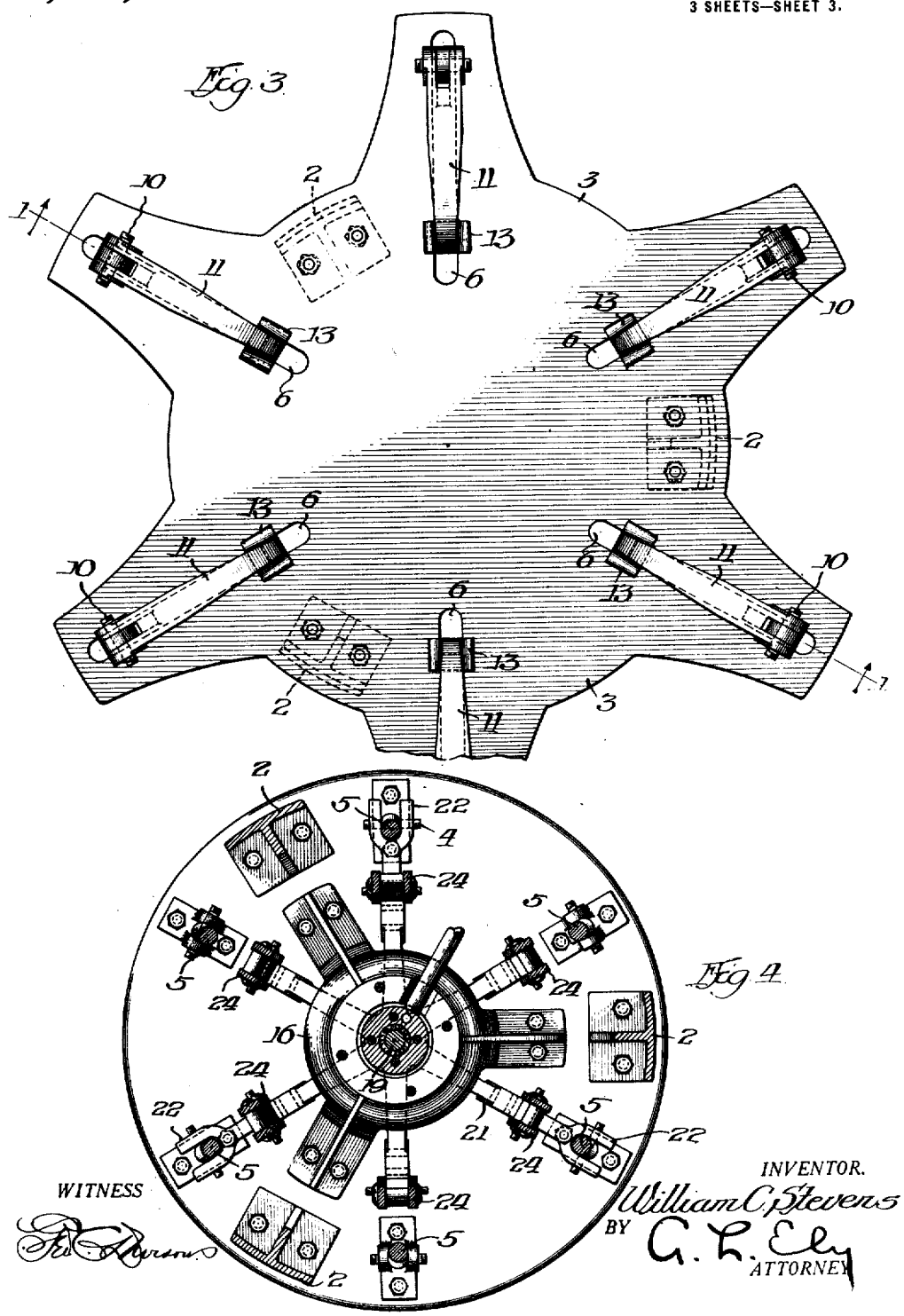

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

TIRE-OPENING MACHINE.

1,288,733.   Specification of Letters Patent.   Patented Dec. 24, 1918.

Application filed May 7, 1918. Serial No. 233,107.

*To all whom it may concern:*

Be it known that I, WILLIAM C. STEVENS, a citizen of the United States, residing at Akron, in the county of Summit, State of Ohio, have invented certain new and useful Improvements in Tire-Opening Machines, of which the following is a specification.

In preparing pneumatic tires, particularly automobile tires for the market, it is customary to assemble the tire casing and the inner tube and generally the tire flap before shipment by placing the tube and flap inside the casing. This has heretofore been done by unskilled laborers who opened the casing by hand while the tube and flap were inserted. The tire casings are stiff and hard to handle and this machine is devised for opening and holding open the casing while the tube is inserted, with or without the flap, making the operation much easier and lessening the possibility of injury to the casing or the tube.

In the drawings accompanying this specification is shown one embodiment of a machine for performing this operation although the showing is illustrative only and the machine is capable of modification without departing from the principles of the invention.

Fig. 2 is a view corresponding to Fig. 1 but showing the casing held open ready to receive the tube.

Fig. 3 is a plan view, and

Fig. 4 is a horizontal section on the line 4—4 Fig. 1.

Figure 1:
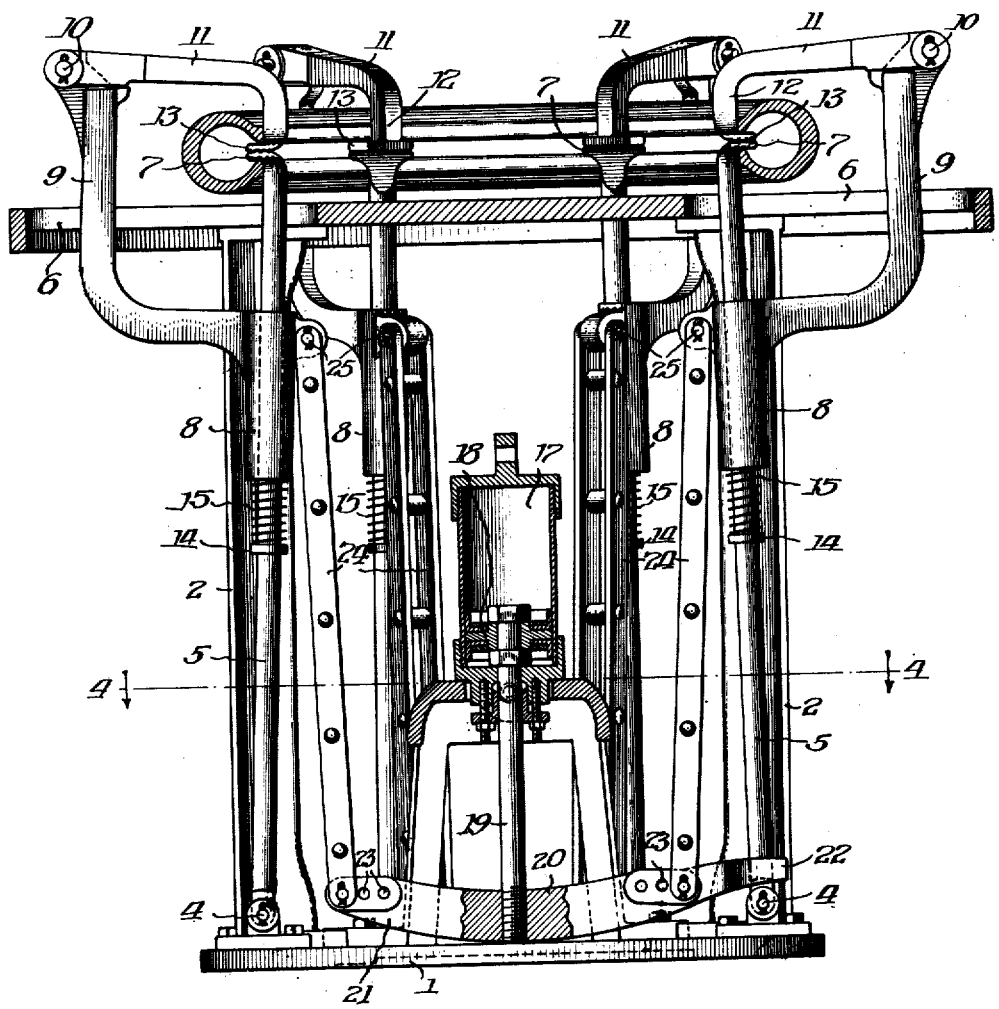
Figure 1 is a vertical section through the machine on line 1—1 of Fig. 3, showing a tire casing in the machine in normal or closed position.

The apparatus comprises a base 1 from which rise legs or standards 2, the upper ends of which support a table 3. On the base there are pivoted at 4 a series of vertical rods or arms 5 arranged in a circle, the upper ends of which pass through radial slots 6 in the table and are provided at their extremities with hooks or fingers bent outwardly as shown at 7.

Slidingly mounted on the upper portion of each rod is a sleeve 8 from which extends through the slot 6 an L-shaped arm 9, the upper end of which carries a pivot 10 on which is mounted a swinging horizontal arm 11 which projects inwardly toward the center of the table. The inner end of the arm is bent downwardly at right angles to the main portion, as shown at 12, and carries an outwardly bent finger or hook 13 which may rest on the finger or hook 7, although this exact arrangement is not essential. This arrangement prevents the arm 11 from dropping down too far to enter the space between the inner edges of the tire casing, although a further movement may be prevented by the upper end of the arm 9 which is arranged to strike the under surface of the arm 11 when the latter is in its proper position.

Secured to each rod 5, below the sleeve 8, is a collar 14, above which a coil spring 15 encircles the rod. On a standard 16 located centrally of the base is a cylinder 17 containing a piston 18, adapted to be operated by compressed air or other fluid. The operation of the cylinder may be governed by any suitable valve mechanism which is not shown. The piston rod 19 carries at its lower end a spider or cross-head 20 provided with a number of arms 21 equal to the number of rods 5. Some of the arms are forked at their extremities as shown at 22 and span their respective rods 5 serving as guides for the spider. Between the rods and the center of the spider are provided a series of holes 23 in which is arranged to be adjusted a link 24, the upper end of which is pivotally connected at 25 to the sleeve 8. It will be seen that the spring 14 forms a cushion for the lower limit of movement of the sleeve and at the same time permits the arms 5 to be moved inwardly to admit the tire casing while the holes 23 permit of adjustment of the arms 5 to accommodate tires of different diameters.

Although there are shown six arms 5 and corresponding arms 11, this number is not essential, it being possible to operate the machine with a less number of arms.

The piston being at the lower limit of its movement, the arms 11 are rocked on the pivots 10 backwardly out of the way, and a tire casing placed around the upper ends of the arms 5. The arms 11 are now thrown back in position and the rods 5 moved inwardly with them against the force of the spring 15 until the hooks 7 and 13 are opposite the edges of the casing when the arms are released and the springs hold the fingers in the position shown in Fig. 1. The operator now admits air into the lower part of the cylinder 17 and the piston is raised to the position shown in Fig. 2. The fingers or hooks 7 and 13 are thereby separated and the edges of the casing are held open in position to have the tube and flap inserted. When this has been done, the piston is released and the tire resumes its normal position and is removed from the machine.

Changes and modifications, within the scope of the appended claims, may be made without in any manner changing the essential features of the invention.

I claim:

1. In a machine for the purpose set forth, the combination of two members adapted to enter the edges of a tire casing and mechanism to separate said members.

2. In a machine for the purpose set forth, the combination of a finger adapted to enter between the edges of a tire casing, a second finger likewise adapted to enter between the edges of the casing and means to move one of said fingers relative to the other to hold the edges of the casing separated.

3. In a machine for the purpose set forth, the combination of a swinging arm, a finger at the end of said arm, a second arm above the first named arm, a pivotal mounting for said second named arm, a finger at the end of said second named arm, and means to move one of said arms relatively to the other whereby the fingers are separated.

4. In a machine for the purpose set forth, the combination of a series of arms arranged in a circle, fingers on the ends of said arms projecting outwardly of said circle, a second series of arms, fingers on the ends of said second arms normally located adjacent said first named fingers, and means for moving one of said series of arms to separate the fingers.

5. In a machine for the purpose set forth, the combination of a series of pivotally mounted arms arranged in a circle, fingers on the ends of said arms projecting outwardly of said circle, a second series of arms pivotal mountings for said second named arms, angular portions at the ends of said second named arms, fingers on the ends of said angular portions adjacent to and extending in the same direction as said first named fingers, and means for moving one of the sets of arms to separate the fingers.

6. In a machine for the purpose set forth, the combination of a series of arms arranged in a circle, fingers on the ends of said arms projecting outwardly of said circle, a second series of arms, pivotal mountings for said second named arms, angular portions at the ends of said second named arms, fingers on the ends of said angular portions adjacent to and extending in the same direction as said first named fingers, and means for moving one of the sets of arms to separate the fingers.

WILLIAM C. STEVENS.

DISCLAIMER.

1,288,733.—*William C. Stevens*, Akron, Ohio. TIRE-OPENING MACHINE. Patent dated December 24, 1918. Disclaimer filed October 25, 1923, by the assignee, *The Firestone Tire & Rubber Company*.

Hereby enters this disclaimer—

"To that part of the claims in said specification which is in the following words, to wit:

"1. In a machine for the purpose set forth, the combination of two members adapted to enter the edges of a tire casing and mechanism to separate said members.

"2. In a machine for the purpose set forth, the combination of a finger adapted to enter between the edges of a tire casing, a second finger likewise adapted to enter between the edges of the casing and means to move one of said fingers relative to the other to hold the edges of the casing separated.

"4. In a machine for the purpose set forth, the combination of a series of arms arranged in a circle, fingers on the ends of said arms projecting outwardly of said circle, a second series of arms, fingers on the ends of said second arms normally located adjacent said first named fingers, and means for moving one of said series of arms to separate the fingers.

"6. In a machine for the purpose set forth, the combination of a series of arms arranged in a circle, fingers on the ends of said arms projecting outwardly of said circle, a second series of arms, pivotal mountings for said second named arms, angular portions at the ends of said second named arms, fingers on the ends of said angular portions adjacent to and extending in the same direction as said first named fingers, and means for moving one of the sets of arms to separate the fingers."

[*Official Gazette November 13, 1923.*]